(12) United States Patent
Adams et al.

(10) Patent No.: US 6,238,026 B1
(45) Date of Patent: May 29, 2001

(54) SYSTEM FOR MOUNTING COMPONENTS IN A COMPUTER CHASSIS

(75) Inventors: Jacklin Ann Adams, Cary; Robert Curtis Crigler, Durham; Peter Torgil Haughton, Chapel Hill; Gerald Cecil Proctor; Rodrigo Samper, both of Raleigh, all of NC (US); Kline Whitehead, Fort Mill, SC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/469,404

(22) Filed: Dec. 22, 1999

(51) Int. Cl.[7] .................................................. A47B 97/00
(52) U.S. Cl. ......................................................... 312/223.2
(58) Field of Search .............................. 312/223.1, 223.2, 312/257.1, 319.1; 361/683, 685, 724, 725, 726, 727, 802; 211/26

(56) References Cited

U.S. PATENT DOCUMENTS

| | | |
|---|---|---|
| 4,683,520 | 7/1987 | Grassens et al. . |
| 4,688,131 | 8/1987 | Noda et al. . |
| 5,040,161 | 8/1991 | Jones et al. . |
| 5,112,119 | 5/1992 | Cooke et al. ........................ 312/283 |
| 5,513,068 | 4/1996 | Girard ................................. 361/685 |
| 5,527,104 | 6/1996 | Moss ............................. 312/223.2 X |
| 5,668,696 * | 9/1997 | Schmitt ................................ 361/685 |
| 5,701,231 | 12/1997 | Do et al. ............................. 361/683 |
| 5,730,515 | 3/1998 | Ho ........................................ 312/350 |
| 6,018,457 * | 1/2000 | Mroz ............................... 361/727 X |
| 6,030,062 * | 2/2000 | Chen et al. ....................... 312/223.2 |
| 6,069,789 * | 5/2000 | Jung ................................ 361/727 X |

FOREIGN PATENT DOCUMENTS 297 05 507    6/1997    (DE) .

OTHER PUBLICATIONS

"Direct Access Storage Device Commodity Assembly Integration into the IBM Personal Computer XT Envelope", IBM Technical Disclosure Bulletin, vol. 30, No. 2, Jul. 1987, pp. 882–887.

"Mounting Method for Disk Drive Unit," IBM Technical Disclosure Bulletin, vol. 29, No. 10, Mar. 1987, pp. 4655–4657.

"Tray Assembly for Mounting Interchangeable Electromagnetic Devices", IBM Technical Disclosure Bulletin, vol. 29, No. 8, Jan. 1987, pp. 3692–3693.

* cited by examiner

Primary Examiner—James O. Hansen
(74) Attorney, Agent, or Firm—George E. Grosser; Andrew Dillon

(57) ABSTRACT

A system for mounting components within a frame of a personal computer where access to only one side of the frame is needed to mount or remove the components with fasteners and fastening tools. The components are secured and restrained from movement in three orthogonal directions. The fasteners are mounted to the exposed side. Bracket guides and spring fingers extend from the frame to provide location and biasing forces to secure the components in their proper locations. This system requires fewer fasteners and reduces assembly time during manufacturing and/or repair. It is easier and quicker to remove and replace a defective component or one which is being upgraded in the system.

14 Claims, 4 Drawing Sheets

SYSTEM FOR MOUNTING COMPONENTS IN A COMPUTER CHASSIS

BACKGROUND OF THE INVENTION

1. Technical Field

This invention relates in general to a hardware mounting system and in particular to mounting interchangeable components within a computer housing. Even more particularly, the invention relates to a system and method for mounting components, such as data access storage devices, within a personal computer housing where only one side of the housing is accessible to the fasteners used to secure the components.

2. Description of Related Art

Computers, particularly personal computers, are manufactured by assembling a variety of components within a housing. The components are usually assembled to a frame that receives and secures each component in a predetermined, removable position with respect to the frame. Each component must be secured in place to retain the component within the housing, and allow a multi-contact electrical connector to couple the component to other portions through an electrical bus within the computer. However, components are also removable and/or replaceable should they fail or the user decides to upgrade the computer.

Such computers are often only partially assembled at the factory in advance of a customer order. Assembly is completed when the configuration desired by a customer has been specified. For example, the computer typically has a system board and standard input/output devices in place, but also has one or more slots for storage devices left open until the user has specified his or her selections. Devices that may be installed in the slots include a CD-ROM device or a diskette drive. In addition, the hard drive might be one of several sizes and speeds, depending on the needs and desires of the customer. Once the customer has identified his or her selections, the chosen components may be inserted and secured in place, thereby avoiding the necessity to inventory every combination for a given product.

Even after the customer has specified his or her computer system and it has been assembled, the system is subject to failure of a component. In such circumstances, it is desirable to remove the defective component and replace it with a properly operating component. Also, since the capacity and operating characteristics of the components are constantly being improved, it is possible for an improved version of a component to become available before the original components wear out. In this circumstance, the user may wish to acquire the improved component and remove and replace the original component. Accordingly, it is desirable that components be quickly and easily interchangeable in the system housing.

Although the number of components required to be mounted within system housings continues to increase, it is not desirable that the overall size of computers increase. In particular, personal computers must be easily transportable and fit within a user's office, either on the desk or under the desk. Thus, as the number of components increases, clever ways of packaging and mounting the components are needed. One way of mounting components exposes only one of the sides of the mounting frame for fasteners (e.g. screws, nuts, etc.), and access for the fastening tools to secure the fasteners in place. While only one side of the mounting frame of the personal computer is exposed, it is still necessary that the component be located in all three orthogonal directions (i.e. height, width and depth) of a slot formed in the housing frame for receiving the component.

Prior art systems have a variety of arrangements for mounting components within a housing. The most common system uses a frame with both lateral sides exposed for tool and fastener access. Typically, such a system employs a pair of mounting screws on each side of the frame and allows the component to be secured in all three orthogonal directions. Thus, four screws must be provided for each component and both sides of the computer must be removable, thereby requiring additional fasteners to be removed and replaced to change out a component. These additional steps add cost to the manufacturing process and additional labor time to the process of changing a component. Accordingly, the designs of the prior art do not solve the needs of the industry to have a component mounting system that is easy, quick, and requires exposure to only one side of the housing for the necessary fasteners and tools.

Accordingly, it is an object of the invention to provide an improved hardware mounting system.

It is another object of the invention to provide a system for mounting interchangeable components within a computer housing.

It is yet another object of the invention to provide a system and method for mounting components, such as data access storage devices, within a personal computer housing where only one side of the mounting is accessible for attachment devices and tools to secure the attachment devices in place.

The foregoing and other objects and advantages of the present invention will be apparent to those skilled in the art, in view of the following detailed description of the preferred embodiment of the present invention, taken in conjunction with the appended claims and the accompanying drawings.

SUMMARY OF THE INVENTION

A system for mounting components within a frame of a personal computer where access to only one side of the frame is needed to mount or remove the components with fasteners and fastening tools. The components are secured and restrained from movement in three orthogonal directions. The fasteners are mounted to the exposed side. Bracket guides and spring fingers extend from the frame to provide location and biasing forces to secure the components in their proper locations. This system requires fewer fasteners and reduces assembly time during manufacturing and/or repair. It is easier and quicker to remove and replace a defective component or one which is being upgraded in the system.

DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
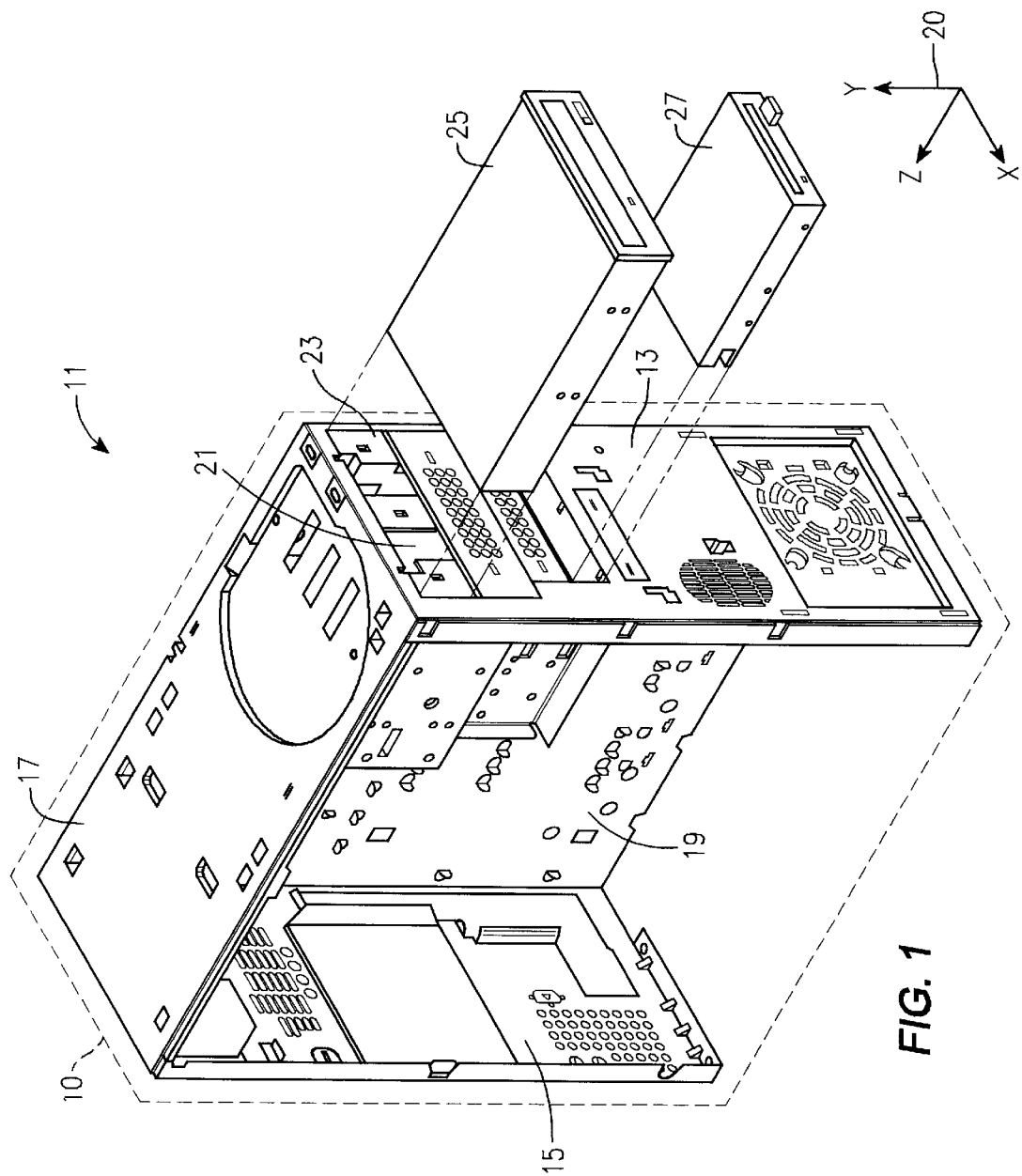
FIG. 1 is an isometric view of a typical environment a personal computer frame, with the outer cover removed and showing a mounting bracket constructed in accordance with the invention.

Referring to FIG. 1, an internal chassis or frame 11 for a personal computer (PC) 10 is shown. Frame 11 mounts inside the personal computer and physically supports many of its components (e.g., motherboard, power supply, cables, external housing, etc.). Frame 11 may be provided for many other types of computer devices having various electrical and electromechanical components. Frame 11 is formed from thin sheet metal with appropriate apertures for allowing necessary communications with the external environment such as input/output, ventilation, power, and switching. In the embodiment shown, frame 11 includes a front panel 13, a rear panel 15, a top panel 17, and a side panel 19. Panels 13, 15, 17, 19 are permanently joined to one another to form a solid, integral mounting substructure. A Cartesian coordinate system 20 is provided for referencing purposes.

The front panel 13 has a front side mounting aperture 21 that is shown partially obstructed with removable plates or knock-outs 23. Knock-outs 23 may be removed from front panel 13, depending upon the types of components installed in frame 11. In this particular embodiment, a CD-ROM device 25 and a 3.5 inch floppy disk drive 27 were selected to be installed in aperture 21 on frame 11. Device 25 and drive 27 are two merely illustrative examples of the many types of components that may be installed in frame 11.

Figure 2:
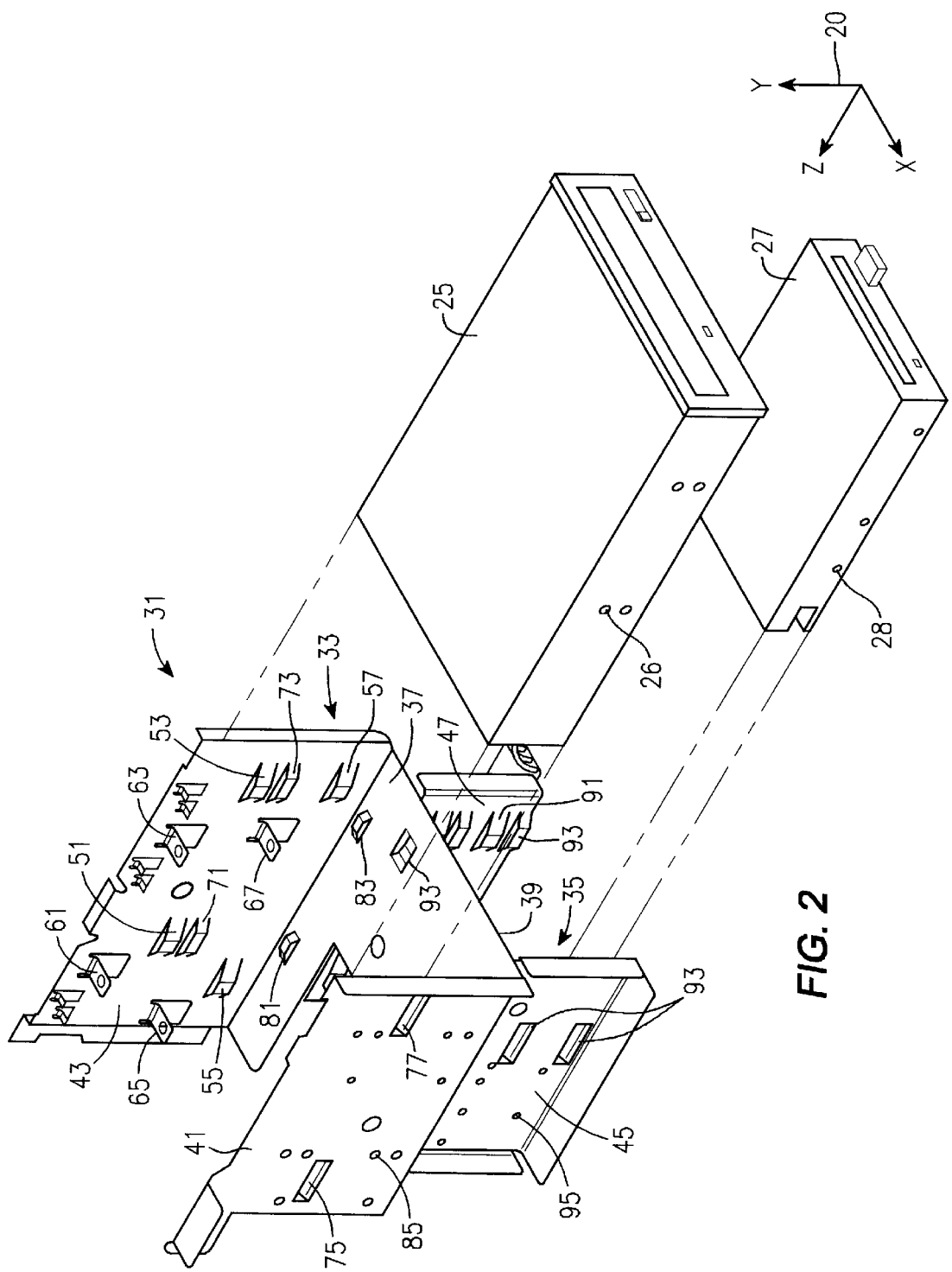
FIG. 2 is an enlarged isometric view of the mounting bracket of FIG. 1, showing examples of two components prior to insertion.

Frame 11 contains a data access and storage device (DASD) mounting bracket 31 located just inside aperture 21 for securing CD-ROM device 25, and disk drive 27 thereto. Bracket 31 securely fastens to frame 11 to form an integral support structure. Like frame 11, bracket 31 is also formed from sheet metal, and may be formed as an integral extension of panels 13, 17, 19. As shown in FIG. 2, bracket 31 has a large upper portion 33 and a small inverted lower portion 35. In the embodiment shown, bracket 31 has four mounting bays or slots that are each capable of supporting one component (two in each portion 33, 35). Upper and lower portions 33, 35 are generally U-shaped, frame-like members that are joined at their bases 37, 39, respectively. Upper portion 33 has a left sidewall 41 and a right sidewall 43 extending from its base 37. Likewise, lower portion 35 has a left sidewall 45 and a right sidewall 47 extending from its base 39.

In the embodiment shown, right sidewall 43 of upper portion 33 has four compliant or spring fingers 51, 53, 55, 57, and four spring tabs 61, 63, 65, 67, for receiving and engaging large components such as CD-ROM device 25. Each spring finger 51, 53, 55, 57 is a generally rectangular, substantially flat, flexibly cantilevered, sheet metal member with a free end that protrudes substantially toward the interior of upper portion 33 at an acute angle relative to the z-axis, and extends substantially in the y-z plane. Each spring tab 61, 63, 65, 67 is also a generally rectangular, flexibly cantilevered, sheet metal member, but extends from sidewall 43 in a substantially perpendicular fashion (along the x-z plane), parallel to base 37. Right sidewall 43 also has two sheet metal alignment rails or shelves 71, 73 formed therein near its center for maintaining alignment of device 25 with respect to bracket 31, and separation between installed devices 25. Shelves 71, 73 are rigid protrusions or embossments that extend toward the interior of portion 33 as a stiff support feature, and are substantially in the y-z plane.

Left sidewall 41 of upper portion 33 has two alignment shelves 75, 77, and base 37 of upper portion 33 has four symmetrical alignment shelves 81, 83 (two of which are visible in FIG. 2). Shelves 75, 77 on left sidewall 41 substantially align with shelves 71, 73 on right sidewall 43 in the y-direction. Shelves 81, 83 are also substantially identical in form and function and also align with each other in the y-direction. Left sidewall 41 also contains a precise array of fastener holes 85. Lower portion 35 of bracket 31 contains scale versions of many of these same features including horizontal spring fingers 91, vertical spring tabs 92 (FIG. 4), alignment shelves 93, and fastener holes 95. Naturally, bracket 31 may be formed with more or fewer fingers, tabs, alignment shelves, and fastener holes, depending upon the number and size of the components installed, and the type, size, and shape of the fingers, tabs, alignment shelves, and fastener holes.

Figure 3:
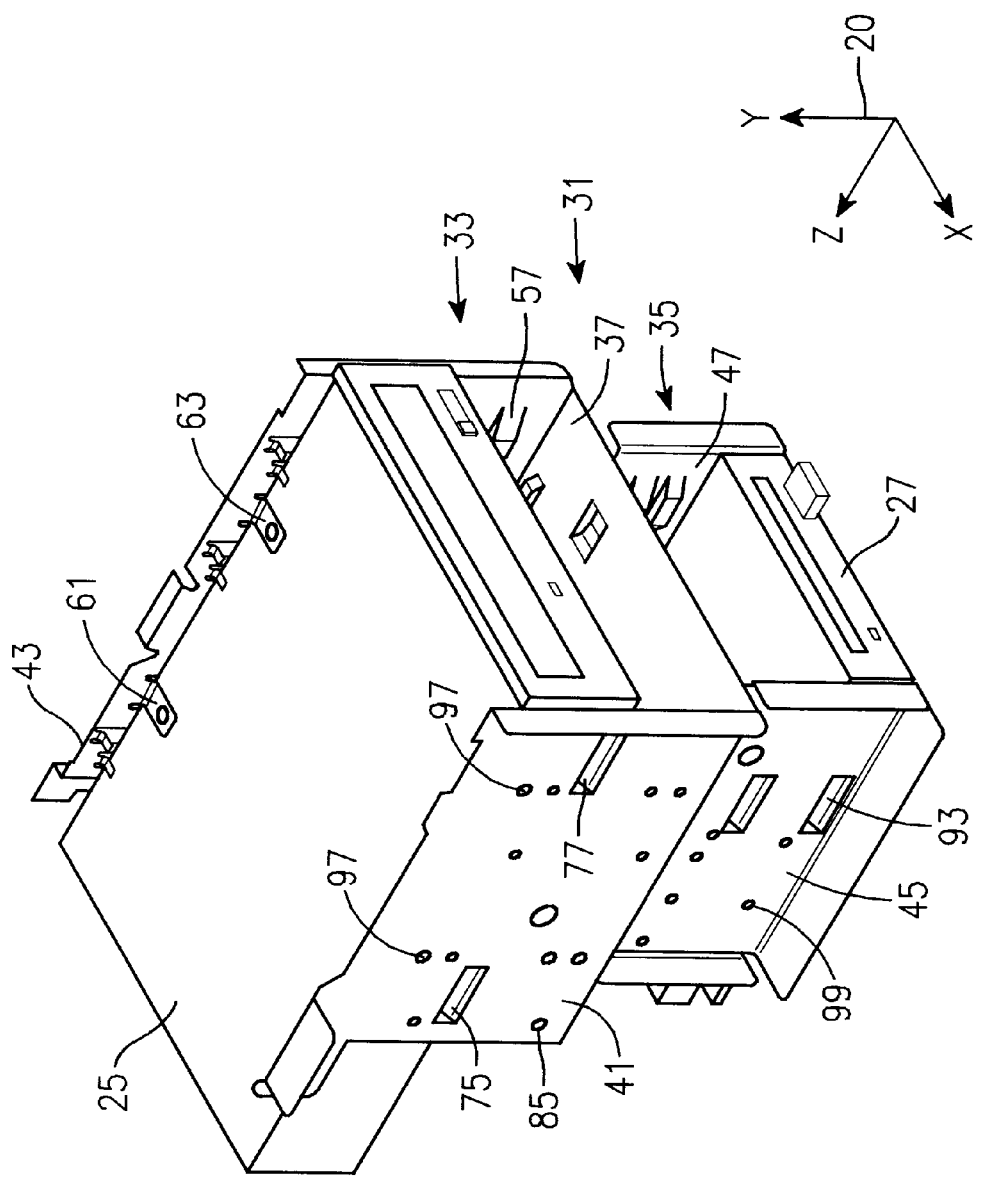
FIG. 3 is an enlarged isometric view of the mounting bracket of FIG. 1, showing examples of two components after insertion.
Figure 4:
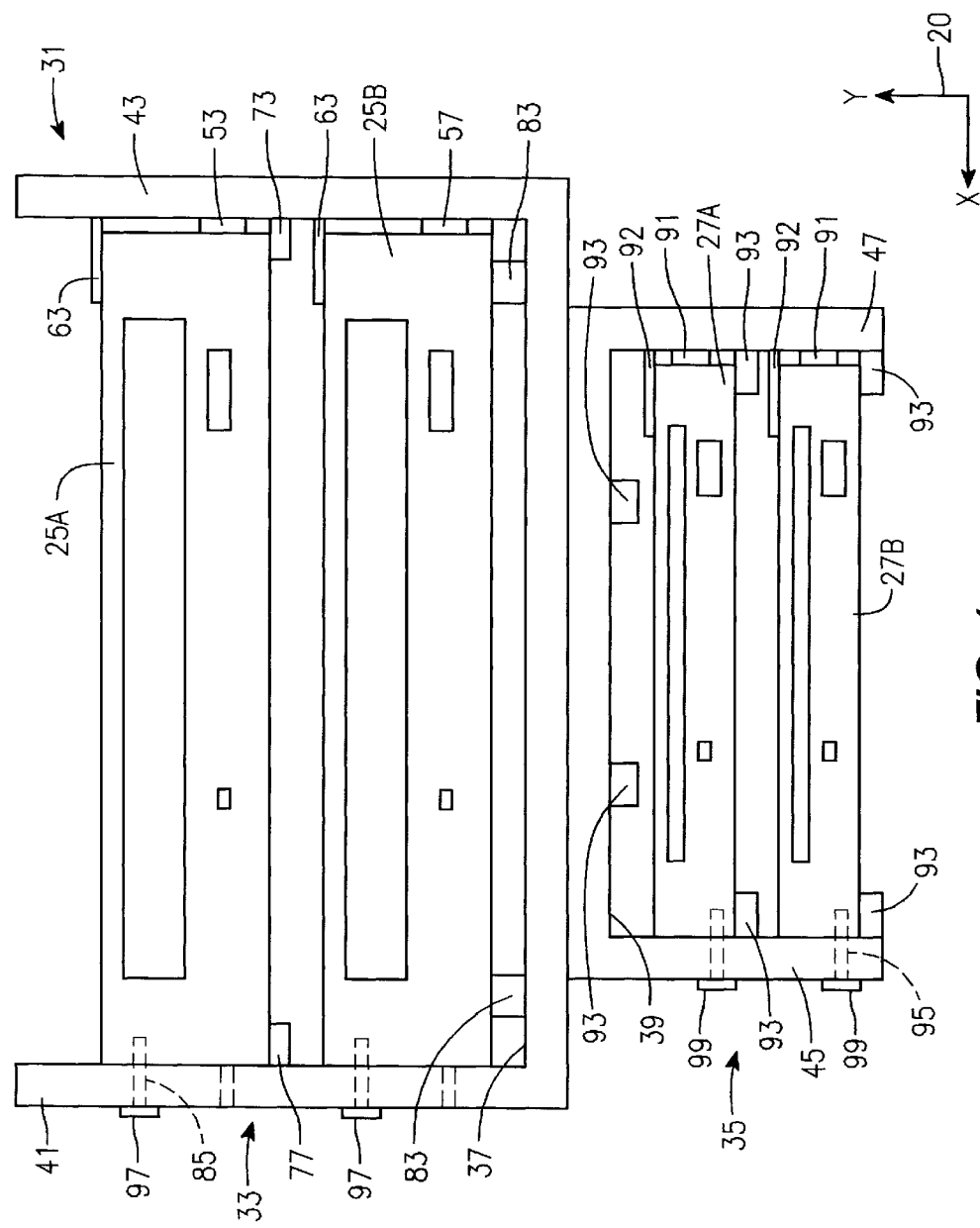
FIG. 4 is a schematic front view of the mounting bracket of FIG. 1, illustrating four inserted components.

In the illustrative embodiment of FIGS. 2–4, each portion 33, 35 is capable of supporting and securing two components such as CD-ROM device 25 and disk drive 27, respectively, for a total of four components in bracket 31, if so desired. For example, to install CD-ROM device 25 in frame 11, device is simply inserted into the desired slot in upper portion 33 of bracket 31. For the upper slot in upper portion 33, this is done by positioning the rear right side edge of device 25a (FIG. 4) between shelf 73 and spring tab 63, and the lower left side edge of device 25a above shelf 77. When these features are correctly positioned and aligned, device 25a is inserted rearward into the slot. Shelf 73 and spring tab 63 simultaneously engage the lower and upper surfaces of device 25a, respectively, to vertically align it in the slot. Although there is physical interference between device 25a and spring tab 63, spring tab 63 deflects vertically and allows device 25a to be inserted. Shelves 71, 73, 75, 77 do not move. As device 25a enters the slot, spring fingers 51, 53 contact the right surface of device 25a and automatically bias it to the correct horizontally lateral (side-to-side) position within the slot. Again, there is physical interference between the side surfaces of device 25a, spring fingers 51, 53, and left sidewall 41. Fingers 51, 53 deflect laterally and allow device 25a to be inserted.

As device 25a continues rearward, it contacts spring tab 61 to maintain vertical compliance. Device 25a is fully inserted when the mounting holes 26 on the left surface of device 25a (FIG. 2) align with holes 85 in left sidewall 41. Although device 25a has four or more holes 26, only two fasteners 97 inserted through two holes 85, 26 are required to properly secure device 25a and maintain it in the correct longitudinal position. Thus, device 25a has six vertical (y-direction) constraint elements (shelves 71, 73, 75, 77; spring tabs 61, 63), and five horizontal constraint elements: three lateral (x-direction) elements (spring fingers 51, 53; left sidewall 41), and two longitudinal (z-direction) elements (fasteners 97).

Device 25b is installed in the lower slot in upper portion 33 (FIG. 4) and is vertically constrained by four shelves 81, 83 and two spring tabs 65, 67; laterally constrained by two spring fingers 55, 57 and left sidewall 41; and longitudinally constrained by two fasteners 97. Disk drive 27a is installed in the upper slot in lower portion 35 and is vertically constrained by two shelves 93 and one spring tab 92; laterally constrained by one spring finger 91 and left sidewall 45; and longitudinally constrained by at least one fastener 99 inserted through hole 95 in sidewall 45 and mounting hole 28 (FIG. 2) in the left surface of drive 27. Finally, disk drive 27b is installed in the lower slot in lower portion 35 (FIG. 4) and is vertically constrained by two shelves 93 and one spring tab 92; laterally constrained by one spring finger 91 and left sidewall 45; and longitudinally constrained by a fastener 99 in left sidewall 45.

The invention has several advantages and overcomes the disadvantages and limitations of the prior art by providing a component mounting system that requires access to only one side of the housing for insertion and removal of components, and provides locating and positioning members in all three spatial directions. This system also requires only one or two fasteners and reduces assembly time. It is easier and quicker to remove and replace a defective component or one which is being upgraded. Components are located in three orthogonal directions with respect to the frame, even if only one side of the frame is available for fasteners. Furthermore, it eliminates the removable front DASD cage that is common in computer minitowers requiring additional screws plus removal and reinstallation time. The present design does not add any part cost to the computer chassis. The spring elements and alignment shelves are formed out of the parent material of the bracket. This design allows considerably more flexibility when designing computer chassis and greatly improves the manufacturability of the PC. The contact made between the tabs, fingers and shelves also aid electromagnetic interference (EMI) grounding.

While the invention has been shown or described in only some of its forms, it should be apparent to those skilled in the art that it is not so limited, but is susceptible to various changes without departing from the scope of the invention. For example, the present invention has been described in connection with storage devices, but is also adaptable for use with other components. Also, the invention has been described with regard to fasteners such as screws or nuts, but other fasteners may be used. In addition, the invention is described in the context of forming the spring fingers integrally with the frame, which is believed desirable to minimize the number of parts and the number of manufacturing steps, but in some applications, it may be desirable to form the spring fingers from another material. For example, a nonconductive or resilient material like rubber or plastic would absorb impacts more efficiently. Accordingly, the foregoing description of the preferred embodiment should be considered as illustrative of the invention rather than a limitation thereof.

What is claimed is:

1. A frame, comprising:
    a plurality of substantially orthogonal panels;
    a bracket mounted to at least some of the panels and having an accessible sidewall, an inaccessible sidewall, and an opening therebetween, wherein the opening defines a bay within the bracket that is adapted to receive a component;
    a support element formed in each of the sidewalls of the bracket and extending into the bay;
    a spring tab formed in the inaccessible sidewall and extending into the bay, the spring tab being adapted to engage and automatically align the component in a y-direction between the spring tab and the support element when the component is inserted into the bay;
    a spring finger formed in the inaccessible sidewall and biased into the bay, the spring finger being adapted to engage and automatically align the component in an x-direction between the spring finger and the accessible sidewall when the component is inserted into the bay; and
    a fastener extending through the accessible sidewall and adapted to engage, retain, and automatically align the component in a z-direction when the component is fully inserted into the bay.

2. The frame of claim 1 wherein the sidewalls of the bracket are formed from sheet metal and the support element, spring tab, and spring finger are integrally formed therefrom.

3. The frame of claim 1 wherein each of the spring tab and the spring finger is generally rectangular and flexibly cantilevered.

4. The frame of claim 1 wherein the spring tab extends substantially in an x-z plane.

5. The frame of claim 1 wherein the spring finger is oriented generally in a y-z plane.

6. The frame of claim 1 wherein the support elements are oriented generally in y-z planes.

7. The frame of claim 1 wherein the fastener comprises two screws.

8. A computer chassis for automatically aligning and supporting a component inserted therein, the component having first, second, third, and fourth surfaces, the chassis comprising:
    a first sidewall extending in a y-direction;
    a second sidewall spaced apart from the first sidewall in an x-direction and substantially parallel thereto;
    a component mounting bay defined between the sidewalls and adapted to receive the component in a z-direction;
    a rigid shelf formed in each of the sidewalls, each of the shelves extending in the z-direction, the shelves being substantially aligned with each other in the y-direction and adapted to contact the fourth surface of the component;
    a first compliant member formed in the first sidewall and extending into the bay, the first compliant member being adapted to contact the third surface of the component;
    a second compliant member formed in the first sidewall between the first compliant member and the shelf in the first sidewall, the second compliant member having a free end that is biased into the bay and adapted to contact the first surface of the component;
    a fastener; and wherein
    when the component is inserted into the bay such that the second surface of the component is located adjacent to the second sidewall, the component is automatically aligned in the x-direction by the second compliant member and the second sidewall, in the y-direction by the shelves and the first compliant member, and in the z-direction by inserting the fastener through the second sidewall and securing the fastener to the second surface of the component.

9. The computer chassis of claim 8 wherein the sidewalls are formed from sheet metal and the shelves and compliant members are integrally formed therefrom.

10. The computer chassis of claim 8 wherein each of the compliant members is a generally rectangular, flexibly cantilevered spring.

11. The computer chassis of claim 8 wherein the first compliant member extends substantially in an x-z plane and is generally perpendicular to the sidewalls.

12. The computer chassis of claim 8 wherein the second compliant member extends substantially in a y-z plane.

13. The computer chassis of claim 8 wherein the shelves extend in substantially y-z planes and protrude toward an opposite sidewall.

14. The computer chassis of claim 8 wherein the fastener comprises a pair of screws.

* * * * *